June 16, 1964 D. M. MacMILLAN 3,137,032
ROLL TOP MATRIX LOADER
Filed March 29, 1960 5 Sheets-Sheet 1
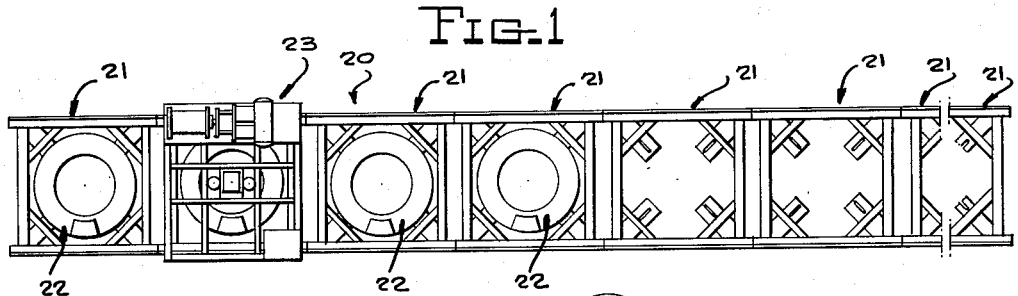
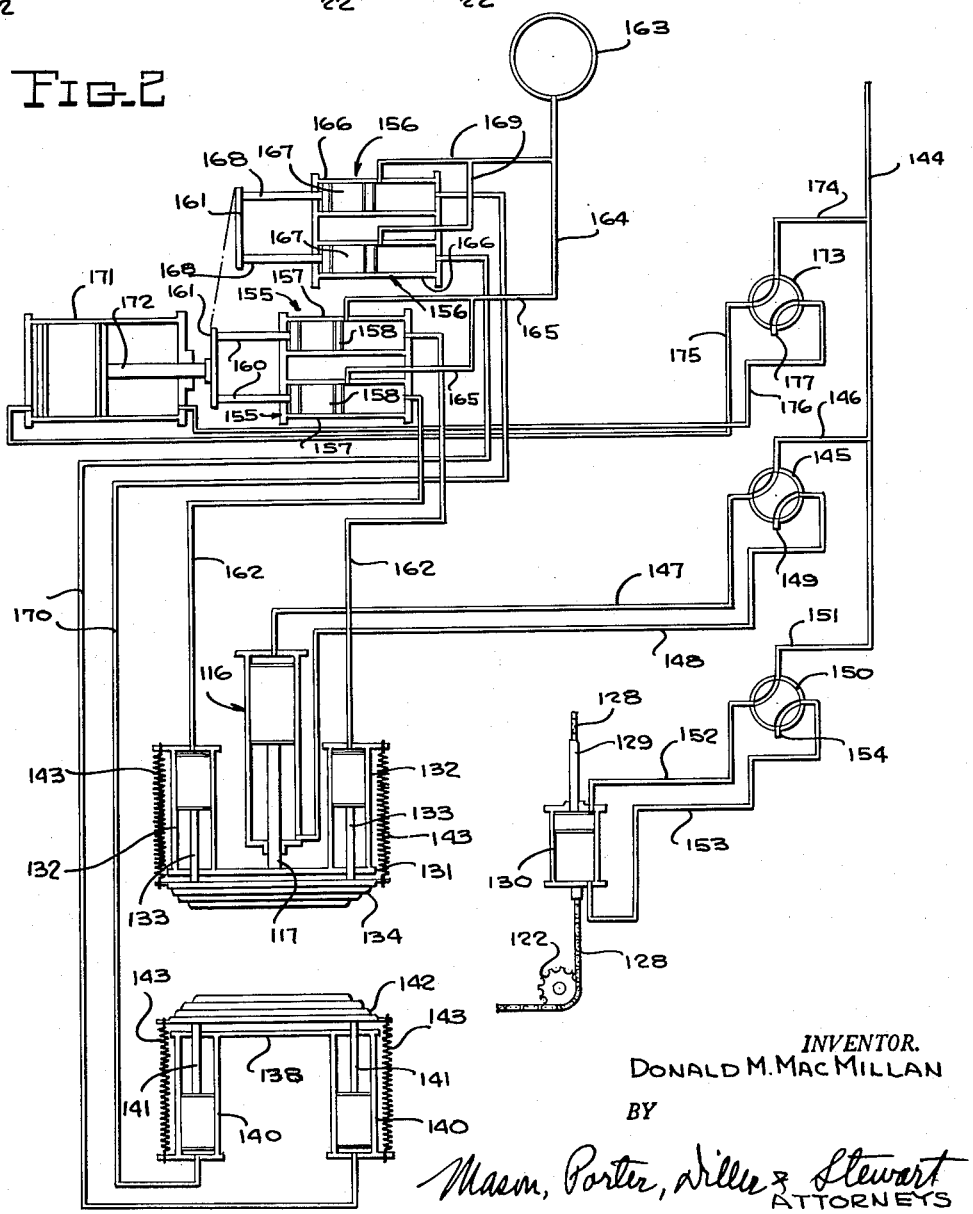
INVENTOR.
DONALD M. MACMILLAN
BY
Mason, Porter, Diller & Stewart
ATTORNEYS

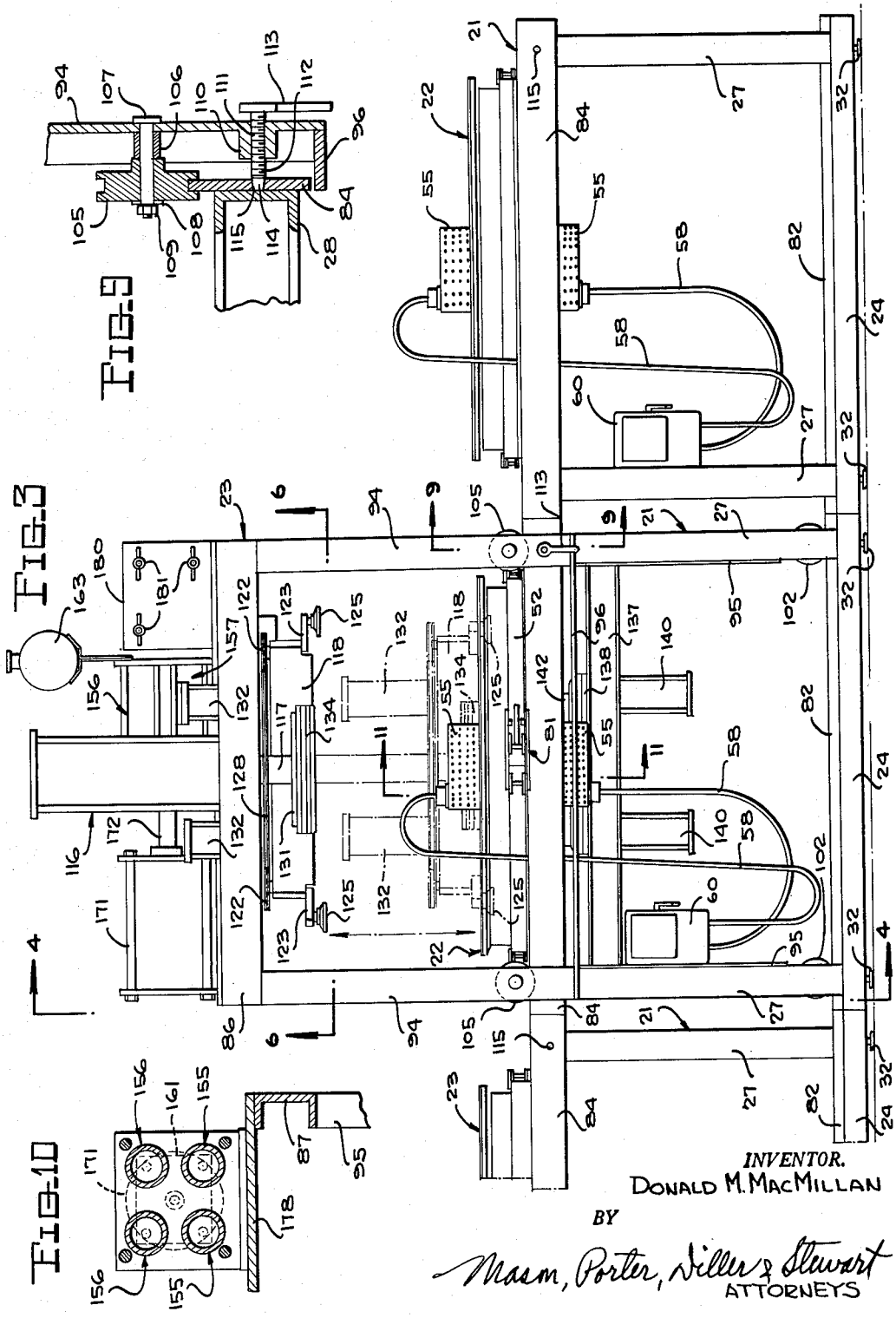

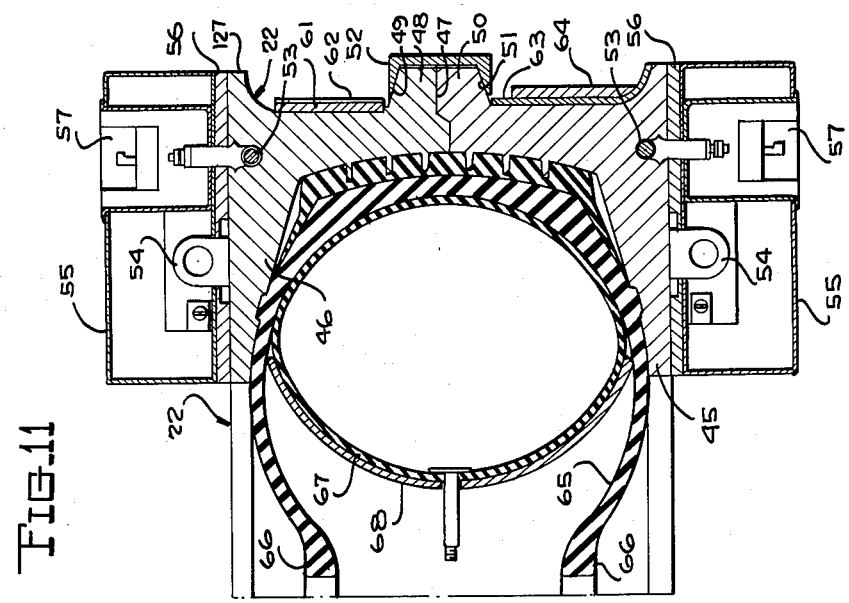
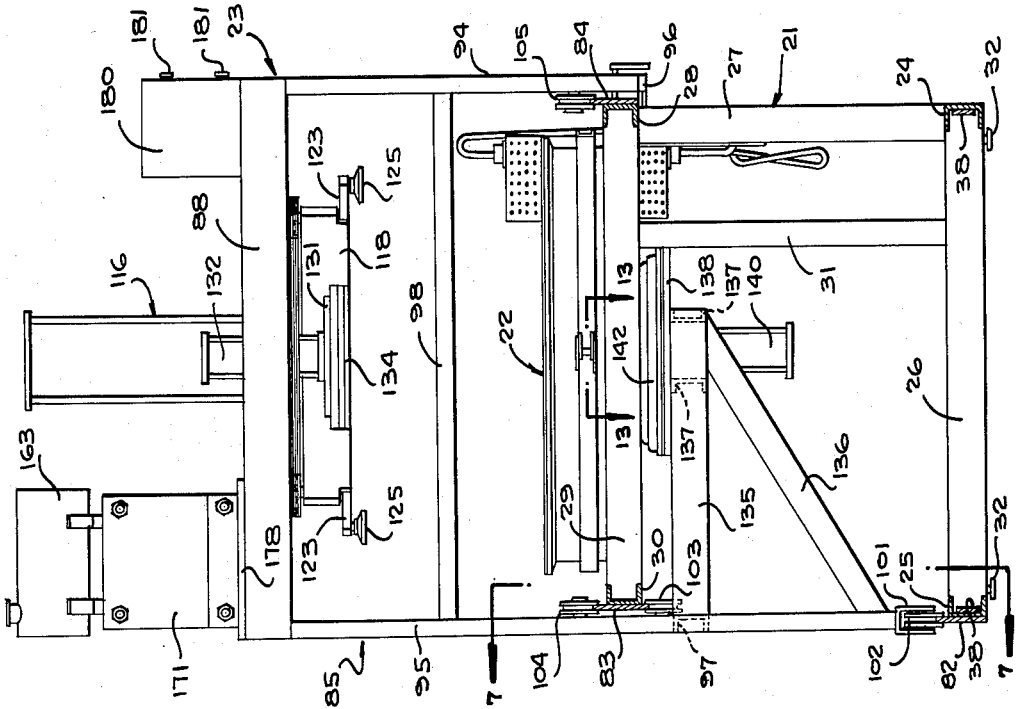

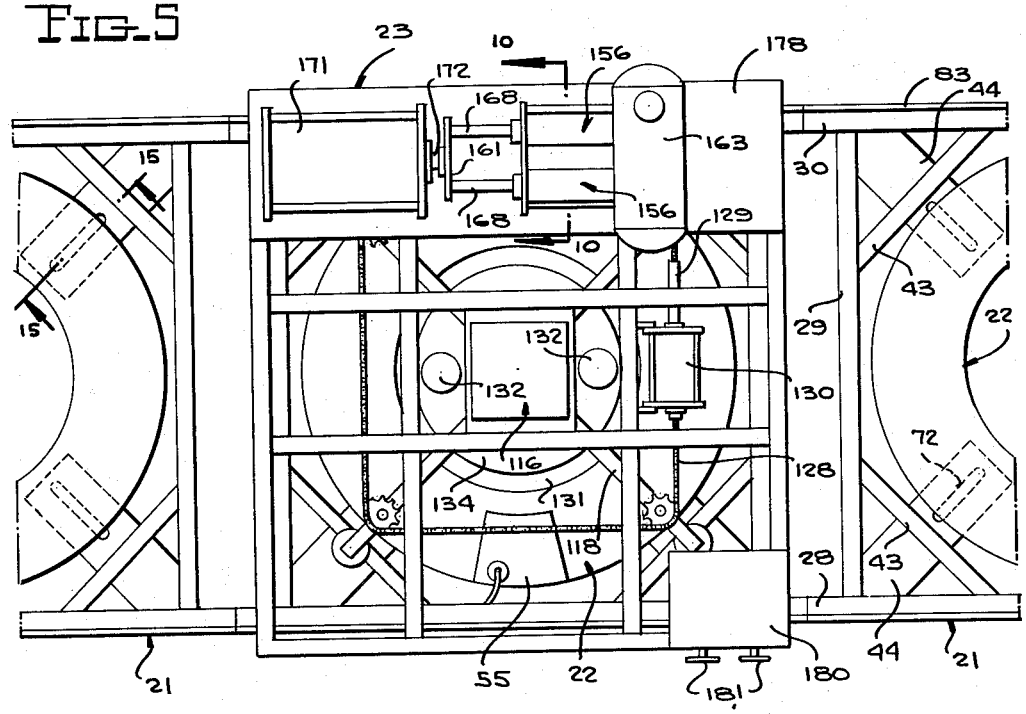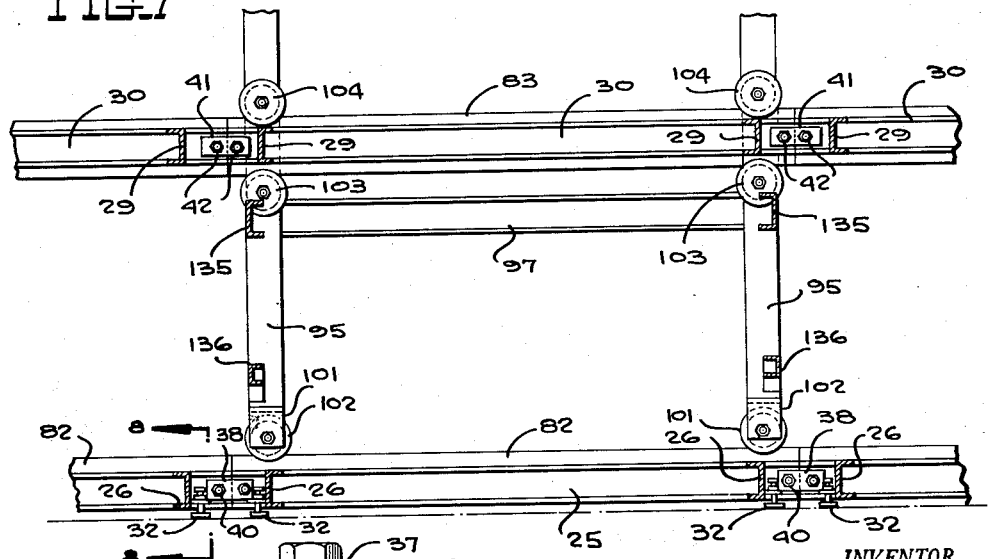

June 16, 1964
D. M. MacMILLAN
3,137,032
ROLL TOP MATRIX LOADER
Filed March 29, 1960
5 Sheets—Sheet 5
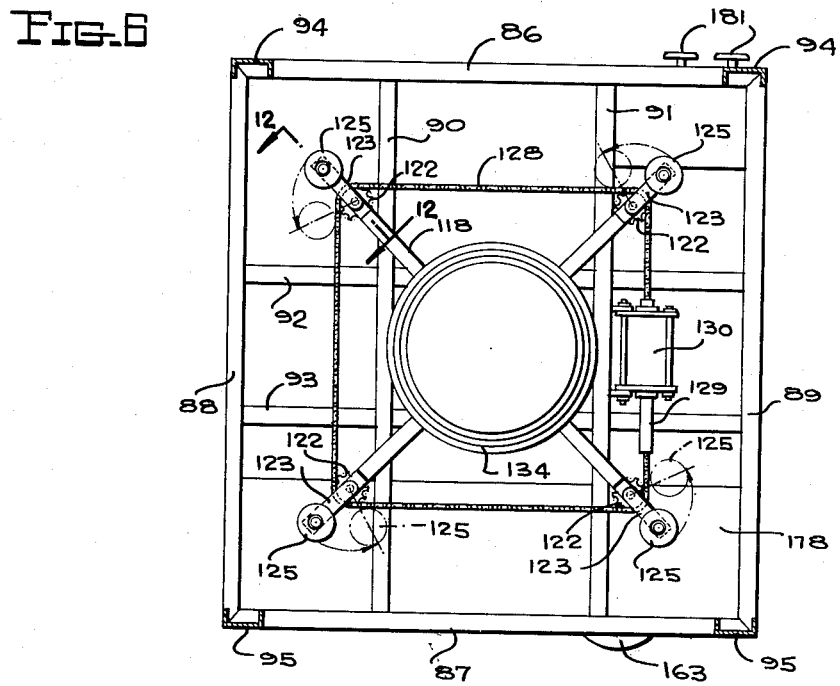
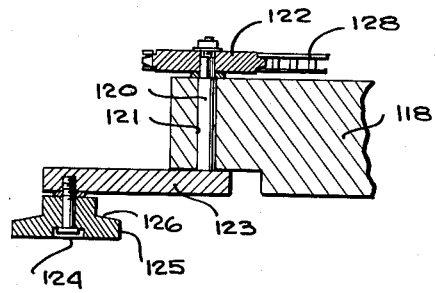
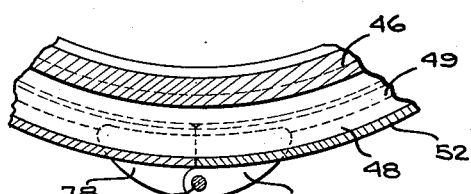
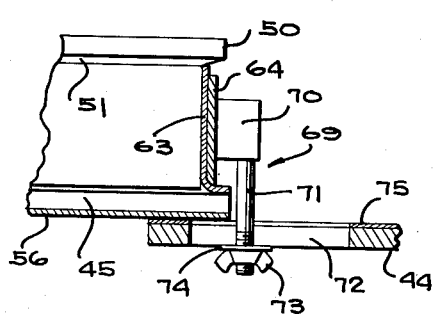
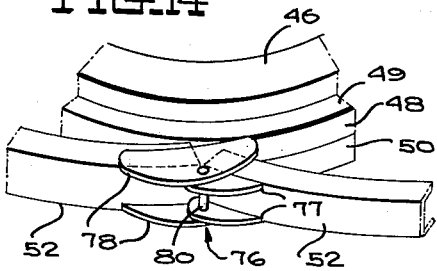
INVENTOR.
DONALD M. MacMILLAN
BY
Mason, Porter, Diller & Stewart
ATTORNEYS _United States Patent Office_ 3,137,032
Patented June 16, 1964

3,137,032
ROLL TOP MATRIX LOADER
Donald M. MacMillan, P.O. Box 557, Macon, Ga.
Filed Mar. 29, 1960, Ser. No. 18,399
10 Claims. (Cl. 18—2)

The invention relates in general to new and useful improvements in tire retreading apparatus, and more particularly relates to a novel apparatus for loading and unloading matrices or molds, each such matrix or mold being horizontally disposed and comprising complementary upper and lower mold or matrix halves.

Most of the retreading being carried on at the present time takes place in individual presses. These presses are provided with matrices which are retained in place in the presses during the entire retreading operation. However, the press is required only during the matrix loading and unloading operation. Once the tire has been properly positioned within the matrix, together with the necessary camelback for the retread, the matrix halves may be locked together and the curing operation take place remote from the press. By so doing, a single press may be used in conjunction with a plurality of matrices, thus eliminating a large percentage of the expensive press structure now in use.

In recent developments, a single loader has been provided for a plurality of matrices. In the use of the loader, each matrix is indixidually placed in the press, after which the matrix is opened utilizing the press, a tire placed within the matrix, the matrix then being closed by the press, after which the matrix and tire are removed as a complete assembly from the press, and the matrix connected to a heating source for the curing of the tire, the curing operation taking place remote from the press. This system has the advantage of utilizing a single press for a plurality of matrices. It also has the advantage of saving the space heretofore required for a plurality of presses. On the other hand, it has its disadvantage in that the relatively heavy matrix, together with the tire, camelback and curing equipment, must be transported from the press to a curing station, and then returned to the press, after which it must be again loaded into the press. This is an undesirable, cumbersome and tiresome process.

The present invention proposes to provide a multiple matrix and press assembly wherein the various matrices remain in position for engagement by the press or loader, and the press or loader is moved from one matrix station to another for the matrix loading and unloading operation.

Another object of the inveniton is to provide a novel retreading apparatus which includes a plurality of matrices arranged in supported positions in alignment, and a loader for use with the matrices mounted on tracks for movement longitudinally of the matrices and positionable over each individual matrix for the purpose of opening and closing the matrix to facilitate a tire loading and unloading operation.

Still another object of the invention is to provide a novel tire retreading apparatus which includes a single press or loader and a plurality of matrices, the matrices being disposed in alignment and being supported at a common level on suitable supporting frames, the supporting frames including rails which extend the length of the line of matrices, and the loader being supported on the supporting rails for movement along the line of matrices for cooperation with individual ones of the matrices to open and close the matrices, as is required in a loading and unloading operation, and there being carried by the loader means for engaging an uppermost matrix half of each matrix for the purpose of centering and elevating the matrix half with respect to the lower matrix half so that a tire being retreaded may be easily positioned within and removed from the matrix with a minimum of effort.

A further object of the invention is to provide a novel locking band for matrix halves, which locking band is utilized to clamp together the matrix halves, and which is provided at its hinge points with cam means for engaging at least one of the matrix halves to forcefully disengage the locking band from the matrix halves as the locking band is opened.

Still another object of the invention is to provide a novel centering device to be carried by a matrix loader for engaging a top matrix half to center the top matrix half with respect to the loader and to facilitate the accurate replacement of the matrix half on a fixed lower matrix half, the centering device including a plurality of arms which are swingable in unison either inwardly or outwardly, and which will engage under a rim on a top matrix half for engaging and lifting the top matrix half when it is so desired.

Yet another object of the invention is to provide a novel bead aligner for use in conjunction with a matrix to properly align the beads of a tire which is to be retreaded, the bead aligner including two opposed aligning rings which are engageable with the beads of a tire, and means for moving the aligning rings towards and away from each other, the means including a fluid system which is of a nature that permits the aligning rings to be moved at equal rates towards and away from each other so that the aligning rings remain equidistant from a fixed center therebetween irrespective of the pressures applied to the individual aligning rings.

With the above, and other objects in view that will hereinafter appear, the nature of the invention will be more clearly understood by reference to the following detailed description, the appended claims, and the several views illustrated in the accompanying drawings:

In the drawings:

FIGURE 1 is a plan view of a tire retreading apparatus in accordance with the invention, and shows a plurality of matrices supported in alignment and the matrix loader being associated with one of the matrices, the matrices being omitted from several of the supports to show the details of the supports therefor.

FIGURE 2 is a diagrammatic view showing the fluid system for operating the tire retreading apparatus.

FIGURE 3 is an enlarged fragmentary elevational view of the tire retreading apparatus of FIGURE 1, and shows more specifically the details of the matrices, their supports and the matrix loader.

FIGURE 4 is an enlarged transverse sectional view, taken along the line 4—4 of FIGURE 3, and shows further the details of the matrix loader and the relationship thereof with respect to one matrix and the support therefor.

FIGURE 5 is an enlarged fragmentary plan view of an intermediate portion of the line of matrices, and shows the relationship of the matrix loader with respect to one of the matrices.

FIGURE 6 is an enlarged horizontal sectional view taken along the line 6—6 of FIGURE 3, and shows the details of the underside of the upper portion of the matrix loader, including the means for engaging the upper half of a matrix.

FIGURE 7 is an enlarged fragmentary vertical sectional view taken along the line 7—7 of FIGURE 4, and shows the details of mounting of one side of the matrix loader with respect to rails which are carried by the matrix supports.

FIGURE 8 is an enlarged fragmentary sectional view taken along the line 8—8 of FIGURE 7, and shows the specific details of a leveling foot for one of the matrix supports.

FIGURE 9 is an enlarged fragmentary vertical sectional view taken along the line 9—9 of FIGURE 3, and shows the specific details of means for locking the matrix loader in position with respect to one of the matrices.

FIGURE 10 is an enlarged fragmentary vertical sectional view taken along the line 10—10 of FIGURE 5, and shows the arrangement of the several pumps for operating the bead aligner.

FIGURE 11 is an enlarged fragmentary vertical sectional view taken along the line 11—11 of FIGURE 3, through one of the matrices, and shows the specific details of the matrix.

FIGURE 12 is an enlarged fragmentary vertical sectional view taken along the line 12—12 of FIGURE 6, and shows the specific details of one of the top matrix half engaging members.

FIGURE 13 is an enlarged fragmentary horizontal sectional view taken along the section line 13—13 of FIGURE 4, and shows the specific details of a connection between a section of the matrix locking band.

FIGURE 14 is an enlarged fragmentary perspective view showing the locking band in a partially open position and cam means thereon forcing the locking band away from the matrix.

FIGURE 15 is an enlarged fragmentary vertical sectional view taken along the section line 15—15 of FIGURE 5, and shows the manner in which the lower matrix half is secured to the matrix support.

In the drawings, the over-all assembly of the retreading apparatus is best illustrated in FIGURE 1, and the retreading apparatus is generally referred to by the numeral 20. The retreading apparatus 20 includes a plurality of matrix supports, which are referred to by the numeral 21, disposed in a single file alignment. Each of the matrix supports 21 supports a matrix, generally referred to by the numeral 22, the matrices of several of the matrix supports being omitted for purposes of clarity. The matrices 22 are disposed uppermost and rest on the top portions of the matrix supports 21. The retreading apparatus 20 also includes a press or matrix loader, generally referred to by the numeral 23. The matrix loader 23 is suitably mounted on the matrix supports 21 for movement therealong, and is selectively positionable in overlying relation to individual ones of the matrices 22 for use in cooperation with the matrices 22.

Each of the matrix supports 21 is generally C-shaped in transverse elevation, as is best shown in FIGURE 4. Each matrix support includes a base portion formed by a pair of longitudinally extending channel-shaped frame members 24, 25, the frame member 24 being disposed forwardmost, and the frame member 25 being disposed rearwardmost. The longitudinal frame members 24 and 25 are joined together adjacent their ends by transverse frame members 26, the frame members 24, 25 and 26 being disposed coplanar.

A pair of uprights 27 extend upwardly from the frame member 24 at the intersections thereof with the transverse frame members 26. An upper longitudinal frame member 28 extends between and secures together upper ends of the standards 27. A pair of upper transverse frame members 29 are secured to the frame member 28 and extend rearwardly therefrom in spaced parallel relation, the frame members 29 overlying the frame members 26. The rear ends of the frame members 29 are connected together by a rear longitudinal frame member 30. Although the frame members 29 are generally cantilevered, they are additionally supported by uprights 31 which extend upwardly from the transverse frame members 26 adjacent the longitudinal frame member 24.

The individual matrix support 21 is leveled and is supported by a plurality of feet 32. Each of the feet 32 is carried by a threaded support 33 which is threadedly engaged in a bore 34 in a gusset plate 35, the gusset plate 35 being disposed within a corner defined by one of the transverse frame members 26 and one of the longitudinal frame members 24, 25. A locking nut 36 is threaded on the support 33 for locking the foot 32 in a vertically adjusted position. The upper end of the support 33 is provided with a head 37 to facilitate the rotation of the support 33 with respect to the gusset 35 to vertically position the foot 32.

The individual matrix supports 21 are secured together in alignment by means of splice bars 38, the splice bars 38 being disposed within the frame members 24 and 25 and secured to adjacent frame members in overlapping relation by means of bolts 40. The frame members 28 and 30 are also connected together by splice bars 41 which overlap the ends of the frame members 28, 20 and are secured thereto by means of bolts 42.

Reference is now made to FIGURE 5 in particular, wherein it will be seen that the frame members 28, 29 and 30 are braced by means of diagonal braces 43, additionally, horizontal supports 44 project inwardly from each of the corners defined by the frame members 28, 29 and 30 and underlie the braces 43, the supports 44 being secured to the frame members and the braces. The matrices 22 rest upon the supports 44 and are secured thereto in a manner which will be described in detail hereinafter.

Reference is now made to FIGURE 11, wherein the details of one of the matrices 22 are illustrated. Each matrix 22 includes a lower matrix half 45 and an upper matrix half 46. The matrix halves 45 and 46 are generally L-shaped in cross-section and are annular in plan. The matrix halves 45, 46 have opposed interlocked portions 47 to assure alignment thereof. The lower part of the upper matrix half 46 is provided with an outwardly directed annular rib 48 which has an outwardly and downwardly sloping upper surface 49. The upper part of the lower matrix half 45 is provided with an outwardly directed annular rib 50 which has an upwardly and outwardly sloping surface 51. A removable, generally channel-shaped locking band 52 engages over the ribs 48, 50 and clamps the matrix halves 45 and 46 together. The locking band 52 has opposed tapered surfaces which engage the surfaces 49, 51 and when the locking band 52 is tightly drawn together, cooperate with the tapered surfaces 49, 51 of the ribs 48, 50 to assure the tight clamping together of the matrix halves 45, 46.

A heating wire or element 53 is embedded in each of the matrix halves 45, 46 and is connected to a thermoswitch 54 positioned within a suitable housing 55. The housing 55 is spaced from its respective one of the matrix halves by insulation 56 and is provided with an electrical receptacle 57 for receiving one end of a conductor 58, as is best illustrated in FIGURE 3. The two conductors for each of the matrices 22 are connected to an electrical outlet box 60 carried by the associated matrix support 21.

The upper matrix half 46 is provided with a peripheral layer of insulation 61 which is held in place by an insulation shield 62. The lower matrix half 45 is also provided with a peripheral band of insulation 63 which is held in place by a relatively thick insulation shield 64 which has a dual purpose to be described in detail hereinafter.

Each of the matrices 22 is adapted to receive a tire 65 to be cured, the tire 65 having the usual beads 66 which are engaged in a manner to be described in detail hereinafter, to assure proper alignment of the tire 65 with the matrix 22. A curing tube 67 is disposed within the tire 65 and is held in place by means of a curing rim 68, the curing tube 67 and the curing rim 68 being conventional.

From the foregoing, it will be readily apparent that each matrix 22 is complete in itself for the purpose of curing a tire during a retreading operation. However, it is necessary that there be provided means for opening and closing each matrix 22 to facilitate the loading of a tire 65 therein for the purpose of retreading the tire, and then removing the tire 65 from the matrix 22 after the retreading operation has been completed. It is for this purpose that the matrix loader 23 is provided.

During a matrix loading and unloading operation, it is necessary that the matrix half 46 be elevated with respect to the matrix half 45. It is also necessary that the matrix 22 be fixed relative to its associated matrix support 21 in a centered position with the lower matrix half 45 fixed against vertical movement. In order to accomplish this the band 64 is provided with a plurality of hold-downs, generally referred to by the numeral 69, and best illustrated in FIGURE 15. Each of the hold-downs 69 includes a block 70 welded or otherwise rigidly secured to the band 64 and having a bolt 71 depending therefrom. The bolt 71 passes through an elongated slot 72 in the associated support 44 and thus permits the proper centering of the matrix 22 with respect to the matrix support 21. The lower matrix half 45 is clamped in place by means of a wing nut 73 threadedly engaged on the lower end of the bolt 71 and bearing against a washer 74 which, in turn, bears against the underside of the support 44. The upper surface of each support 44 is provided with an insulating layer 75 to reduce the heat transfer from the matrix 22 to the matrix support 21.

In FIGURES 13 and 14, additional details of the locking band 52 are illustrated. The locking band 52 is formed of a plurality of individual segments, there preferably being three segments, although the number may be greater. The segments of the locking band 52 are hingedly connected together by a hinge structure, generally referred to by the numeral 76. The hinge structure 76 includes a pair of outwardly directed ears 77 on one of the locking band segments, and a pair of ears 78 on the adjacent locking band segment. The ears 77 are secured to the vertical portion of the locking band 52, whereas the ears 78 overlie the horizontal or flange portions of the locking band 52. A pin 80 extends through the ears 77 and 78 to hingedly connect together the ears 77 and 78.

The ears 78 differ from the ears 77 in that they extend a considerable distance beyond their respective locking band segment, and are configured to engage the main portion of the matrix halves. When the locking band 52 is swung to an open position, the projecting portions of the ears 78 cam against the matrix halves and force the locking band off of the ribs 48, 50. In this manner, the locking band 52 is self-disengaging. The locking band 52 is provided with a suitable latch structure of the type which tightens the locking band 52 when it is closed, the latch structure being generally referred to by the numeral 81 and best illustrated in FIGURE 3.

It is the intention of this invention that the matrix loader 23 travel along the line of matrix supports 21 and be selectively positioned in overlying relation to any one of the matrix supports for the purpose of opening and closing the individual matrix with which it is aligned. To this end, the matrix supports 21 are provided with a plurality of rails. These rails include a bottom rear rail 82 which is secured to the longitudinal frame member 25 and projects upwardly thereabove. A second rear rail 83 is secured to the rear surface of the longitudinal frame member 30 and projects both above and below this frame member. A forward rail 84 is secured to the forward face of the longitudinal frame member 28 and projects upwardly thereabove. The positions of the rails 82, 83 and 84 are best illustrated in FIGURE 4.

The matrix loader 23 includes a frame which is generally referred to by the numeral 85. The frame 85 includes a generally rectangular top frame structure which is best illustrated in FIGURE 6. The top frame structure includes a forwardly disposed longitudinal frame member 86 and a rear longitudinal frame member 87. The frame members 86 and 87 are connected together by transverse frame members 88 and 89. Additional transverse frame members 90 and 91 connect together intermediate portions of the frame members 86 and 87. Other longitudinal frame members 92 and 93 connect together intermediate portions of the frame members 88, 89, 90 and 91.

A pair of forward standards 94 depend from the ends of the frame member 86. A pair of rear standards 95 depend from the ends of the frame member 87. As is best illustrated in FIGURE 4, the standards 95 are much longer than the standards 94. The lower ends of the standards 94 are connected together by a longitudinal frame member 96. Lower portions of the standards 95 are connected together by a longitudinal frame member 97, the frame member 97 being disposed slightly below the upper surface of the matrix supports 21. Adjacent ones of the standards 94 and 95 are connected together by transverse frame members 98.

The lower ends of the standards 95 are provided with yokes 101 which carry wheels 102, the wheels 102 being grooved and engaging the upper surface of the rail 82. Other grooved rear wheels 103 engage the undersurface of the rail 83, the wheels 103 being carried by the standards 95. The standards 95 also support grooved wheels 104 which engage the upper surface of the rail 83. The lower portions of the standards 94 carry grooved wheels 105 which ride on the upper surface of the rail 84. It will be readily apparent that the wheels 102, 104 and 105 support the matrix loader 23 for rolling movement along the line of matrix supports 21, and the wheels 103 prevent the upward movement of the matrix loader 23 with respect to the matrix supports 21.

A typical wheel mounting is best illustrated in FIGURE 9, wherein the details of mounting one of the wheels 105 is best illustrated. The standard 94 has secured to the rear surface thereof a bushing 106. An axle bolt 107 passes through the standard 94 and the bushing 106 and projects rearwardly beyond the bushing 106. The wheel 105 is rotatably journaled on the axle bolt 107 and is retained in place by means of a washer 108 and a nut 109.

The details of the lock for retaining the matrix loader 23 in alignment with a matrix support 21 are also illustrated in FIGURE 9. The lower portion of one of the standards 94 is provided with a bushing 110 which is generally aligned with the frame member 28 and the rail 84. The bushing 110 is provided with an internally threaded bore 111 in which there is threadedly engaged a latch bolt 112. The latch bolt 112 is provided at the forward end thereof with a handle 113 to facilitate the turning thereof. The rear end of the latch bolt 112 is tapered, as at 114, and is received in a tapered bore 115 in the rail 84. In this manner, alignment of the matrix loader 23 with each matrix support 21 is assured.

Referring now to FIGURES 3 and 4, it will be seen that a vertically disposed double acting hydraulic cylinder is mounted on the upper part of the matrix loader frame in a centrally located position, the hydraulic cylinder being generally referred to by the numeral 116. The hydraulic cylinder 116 includes a piston rod 117 which projects down through the upper part of the frame 85 and to the lower end of which is secured and X-frame 118 which is horizontally disposed.

Referring now to FIGURE 12 in particular, it will be seen that the outer end of each arm of the X-frame 118 has a vertical bore 120 in which a shaft 121 is journaled. A sprocket 122 is secured to the upper end of the shaft 121. An arm 123 is secured to the lower end of the shaft 121. The opposite end of the arm 123 has a depending pivot bolt 124 which carries a horizontally disposed upper matrix half engaging support 125 which is generally of a wheel shape and has an inwardly and upwardly sloping upper surface 126. Each upper matrix half 46 has an upper outwardly projecting rib 127 (FIGURE 11) with a downwardly and inwardly sloping undersurface corresponding generally to the surface 126. It is beneath this rib 127 that the supports 125 are intended to engage.

Reference is now made to FIGURE 6 wherein it is shown that an elongated chain 128 is engaged over the several sprockets 122. The chain 128 has one end thereof connected to one end of a piston rod 129 of a horizontally disposed hydraulic cylinder 130, and the other end thereof connected to the opposite end of the piston rod 129. The hydraulic cylinder 130 is of a double acting type and is suitably mounted on the frame member 91. It will be seen that when the hydraulic cylinder 130 is actuated to move the chain 128, the arms 123 will be swung to move the supports 125 inwardly or outwardly, as desired.

As is best illustrated in FIGURE 4, the X-frame 118 has the central portion thereof recessed. Seated in the upper part of the recess and rigidly secured to the X-frame is a circular mounting plate 131. A pair of transversely spaced, vertically disposed, single acting hydraulic cylinders 132 are secured to the upper portion of the plate 131. Each hydraulic cylinder 132 has a piston rod 133 (FIGURE 2) which extends through the plate 131 and which is secured to a bead aligner 134. The bead aligner 134 is of the stepped type to be used with a plurality of different diameter beads.

Referring once again to FIGURE 4 in particular, it will be seen that each of the standards 95 has extending forwardly therefrom a frame member 135 which lies generally in the same plane as the frame member 97. Each of the frame members 135 is braced by an upwardly and forwardly sloping diagonal brace 136 which is secured to the lower portion of its respective standard 95. A pair of frame members 137 extend between the frame members 135, the frame members 137 being centered on the center of the hydraulic cylinder 116. A circular plate 138 overlies and is secured to the frame members 137, the plate 138 being aligned with the plate 131. A pair of transversely spaced hydraulic cylinders 140 depend from the underside of the plate 138, generally in alignment with the hydraulic cylinder 132. The hydraulic cylinders 140 are of the single acting type and have piston rods 141 which extend upwardly through the plate 138, the upper ends of the piston rods 141 being secured to a bead aligner 142 which is identical with the bead aligner 134.

The hydraulic cylinders 132 and 140 being of the single acting type, it is necessary that some means be provided for returning the bead aligners 134 and 142 to their retracted positions. Accordingly, suitable return springs 143 are provided.

At this time, it is pointed out that although the cylinders 116 and 130 have been described as being hydraulic cylinders, they may be air cylinders, if desired. In the control system for the cylinders 116 and 130, a main supply line 144 is provided. A four-way valve 145 for controlling the operation of the cylinder 116 is provided. The four-way valve 145 has a line 146 connected to the line 144. Two lines 147 and 148 are connected to opposite ends of the cylinder 116 and to the four-way valve 145. The four-way valve 145 also includes an exhaust 149. Of course, if the cylinder 116 is a hydraulic cylinder, the exhaust 149 will be coupled to a return line (not shown).

A four-way valve 150 is also provided for controlling the operation of the cylinder 130. The four-way valve 150 is connected to the supply line 144 by a line 151. Lines 152 and 153 connect opposite ends of the cylinder 130 to the four-way valve 150. The four-way valve 150 also includes an exhaust 154 which, like the exhaust 149, will be connected to a return line in event the cylinder 130 is hydraulically operated.

In order that the bead aligners 134 and 142 may properly center a tire, such as the tire 65, within the matrix 22, it is necessary that the bead aligners 134 and 142 be spaced equally distant with respect to a median plane passing through the center of the tread of the tire. Heretofore, this has presented a problem, since the weight of the upper bead aligner tends to increase the pressure applied on the upper bead, whereas the weight of the lower bead aligner detracts from the pressure applied to the lower bead. Furthermore, variations in thickness of beads in a single tire are to be found and affect the proper centering of the beads. A control system for operating the cylinders 132 and 140 in unison so that the bead aligners 134 and 142 move the same distances notwithstanding variations in loads thereon, has been provided. This system includes two pumps, generally referred to by the numeral 155, connected to the cylinders 132, and two pumps, generally referred to by the numeral 156, connected to the cylinders 140.

Each of the pumps 155 includes a cylinder 157 which has a piston 158 which, in its retracted position, is disposed in the left end thereof. Piston rods 160 are connected to the pistons 158 and extend from the left ends of the cylinders 157. The piston rods 160 are connected to a common force applying plate 161. Hydraulic lines 162 extend from the right ends of the cylinders 157 and are connected to their respective hydraulic cylinders 132.

An oil reservoir 163 is mounted in an elevated position with respect to the cylinders 157. The oil reservoir 163 has a main feeder line 164 which is, in turn, connected to auxiliary feeder lines 165 which open into the cylinders 157 intermediate their ends and to the right of the retracted position of each piston 158. In this manner, any leakage which may exist in the system is automatically replaced each time the pistons 150 are retracted.

The pumps 156 are identical to the pumps 155 and have cylinders 166. A piston 167 is disposed in each of the cylinders 166 and has an at-rest position at the left end of the cylinder 166. A piston rod 168 extends through the left end of the cylinder 166 and is connected to a respective one of the pistons 167. The piston rods 168 are connected to the common force applying plate 161. Feed lines 169 extend from the main feed line 164 of the oil reservoir 163 and open into the cylinders 166 to the right of the at-rest positions of the pistons 167. Fluid lines 170 extend between the right ends of the cylinders 166 and respective ones of the hydraulic cylinders 140.

The piston rods 160 and 168 being connected to a common force applying plate 161, and the pumps 155 and 156 being of equal capacity, it will be seen that the bead aligners 134 and 142 must move at the same rate and remain equidistant with respect to a median line.

A double acting fluid motor 171 has a piston rod 172 connected to the force applying plate 161. The operation of the fluid motor 171 is controlled by a four-way valve 173 which is connected to the pressure line 144 by a fluid line 174. Fluid lines 175 and 176 extend between the four-way valve 173 and the fluid cylinder 171. The four-way valve 173 also has an exhaust 177, which, in the event the actuating fluid is a hydraulic fluid, will be connected to a return line.

Referring now to FIGURE 5 in particular, it will be seen that a plate 178 overlies the upper part of the frame 85 of the matrix loader 23. The cylinder 171, the pumps 155 and 156 and the oil reservoir 163 are suitably mounted on this plate 178. A control box 180 is positioned on the forward right corner of the frame 85 and is provided with suitable handles 181 for controlling the positions of the valves 145, 150 and 173.

*Operation*

The matrices 22 may vary in tire size and tread pattern. Since the matrix supports 21 are identical, it is only necessary that the matrices 22, irrespective of their tire size, be centered with respect to their matrix supports. If desired, the matrix loader 23 may be utilized in the centering of the matrices. A matrix may be positioned on the supports 44 of a matrix support 21 with the hold-down nuts 73 only loosely disposed. The matrix loader 23 may then be centered over the associated matrix support 21 and locked in place utilizing the latch bolt 112. The X-frame 118 may then be lowered so that it rests generally upon the matrix 22, after which the cylinder 130 will be actuated to bring the supports 125 into engagement with the upper half of the matrix. As the supports 125 engage the upper half of the matrix, if the matrix is not centered, the supports 125 will automatically shift the matrix and center the matrix. Once the matrix has been centered, the hold-down nuts 73 may be tightened and the matrix 22 thus retained in its centered position with respect to its matrix support 21 and the matrix loader 23.

When it is desired to open a matrix 22 for the removal of a retreaded tire therefrom and the positioning of a tire to be retreaded therein, the matrix loader 23 is aligned with the intended matrix and locked in place by use of the latch bolt 112. Then, by operating the valve 145, the cylinder 116 is actuated to lower the X-frame 118 down onto the top of the matrix. The cylinder 130 is then actuated by controlling the position of the valve 150 to move the supports 125 into engagement with the top marix half 46. The supports 125, which function as clamps, clamp beneath the projecting rib 127 of the upper matrix half 46. At the same time, the upper matrix half 46 is forcefully urged downwardly with respect to the lower matrix half 45 so that the locking band 52 may be released by unlatching the latch or toggle 81 thereof. As the locking band 52 is opened, it is automatically cammed away from the matrix halves, in the manner described hereinbefore, and may be removed therefrom. The top matrix half 46 is now free to move upwardly with the X-frame 118. The valve 145 is now controlled to move the X-frame upwardly, carrying the matrix half 46 upwardly while the lower matrix half 45 remains stationary on its associated matrix support 21. The tire which has just been retreaded is now free to be removed from the matrix. The bead aligners 134 and 142 may be used to unseat the retreaded tire from the matrix half in which it sticks when the matrix is opened, should this be necessary.

When reloading the matrix, the bead aligners are projected towards each other so that the bottom bead aligner is raised sufficiently to receive the uncured tire beads thereon to center the tire in the matrix. The bead aligners are then retracted with the uncured tire to settle within the bottom matrix half. The valve 145 is then actuated to lower the top matrix half 46 to its cooperating position with respect to the bottom matrix half 45. While the matrix halves are held in these positions, the locking band 52 is replaced.

After the matrix has been locked up, the bead aligners 134 and 142 are centered to center the beads of the tire equidistant between the matrix flanges, thereby centering the tire in the matrix and causing the tread of the tire to be centered on the tire. While holding the beads of the tire in this centered position, the curing bag or tube 67 is inflated. After the bag has been inflated, the bead aligners are retracted and the tire is ready to be cured. Incidentally, the bead aligners may be used to force the beads of the tire together, thereby making the tire smaller where necessary to seat the tire properly within the matrix.

After a matrix has been loaded, the electrical current is supplied thereto and the new tread is cured on the tire. While the curing operation is taking place, the matrix loader 23 may be moved along the line of matrices, and used in conjunction with another one of the numerous matrices for loading and unloading the same.

It will be readily apparent that the proposed tire retreading apparatus permits the efficient use of a single loader in conjunction with a plurality of matrices, and at the same time, permits the matrices to be individually cured separate from the matrix loader. Furthermore, since the matrices are fixed and are not moved, the matrix loader being moved, it will be readily apparent that it is not necessary for a workman to handle a relatively heavy matrix loaded with a tire, curing rim and tube. It is merely necessary to move the matrix loader from one matrix to another. This is readily accomplished, since the matrix loader is mounted on tracks and wheels and may be easily rolled from one position to another.

Although a specific matrix has been illustrated and described herein, it is to be understood that this invention is not so limited. The matrix loader may be utilized in conjunction with any conventional type of matrix which may be vertically separated.

From the foregoing, it will be seen that novel and advantageous provision has been made for carrying out the desired end. However, attention is directed to the fact that variations may be made in the example method and apparatus disclosed herein without departing from the spirit and scope of the invention, as defined in the appended claims.

I claim:

1. A tire retreading apparatus comprising a plurality of matrix supports disposed in a line, matrices mounted on said matrix support in spaced relation, rails supported by said matrix supports, and a matrix loader, said matrix loader having wheels engaged with said rails mounting said matrix loader for movement along the line of matrix supports for cooperation with individual ones of said matrices to aid in opening and closing said matrices for the purpose of loading and unloading said matrices.

2. A tire retreading apparatus comprising a plurality of matrix supports disposed in a line, matrices mounted on said matrix supports in spaced relation, a matrix loader, and means on said matrix supports and said matrix loader mounting said matrix loader for movement along the line of matrix supports for cooperation with individual ones of said matrices to aid in opening and closing said matrices for the purpose of loading and unloading said matrices, each matrix including a lower matrix half and an upper matrix half with said matrix halves normally being clamped together by manually releasable clamping means, said lower matrix half being secured to its associated matrix support; and said matrix loader including means for clamping and elevating said upper matrix half, and opposed spaced bead aligning means carried by said matrix loader and centered axially relative to said upper matrix half clamping means for engaging beads of a tire to be cured for centering the tire within a matrix.

3. The apparatus of claim 2 wherein said bead aligning means includes a pair of opposed bead aligners for engaging tire beads of different diameters, and means connected to said bead aligners for projecting and retracting said bead aligners in unison and at the same rate.

4. The apparatus of claim 2 wherein said bead aligning means includes a pair of opposed bead aligners for engaging tire beads of different diameters, hydraulic cylinders connected to said bead aligners for projecting and retracting said bead aligners, a hydraulic pump directly connected to each of said hydraulic cylinders, and common actuating means for actuating said pumps to move said bead aligners in unison and at the same rate.

5. The apparatus of claim 4 wherein said pumps have a constant supply of hydraulic fluid to compensate for any loss of hydraulic fluid.

6. The apparatus of claim 2 wherein said bead aligning means includes a pair of opposed bead aligners for engaging tire beads of different diameters, and means connected to said bead aligners for projecting and retracting said bead aligners at the same rate.

7. A tire retreading apparatus comprising a plurality of matrix supports disposed in a line, each of said matrix supports being generally C-shaped in side elevation and having a base, an upright and a cantilevered upper matrix support member, matrices mounted on said matrix support in spaced relation, and a matrix loader, cooperating means on said matrix supports and said matrix loader mounting said matrix loader for movement along the line of matrix supports for cooperation with individual ones of said matrices to aid in opening and closing said matrices for the purpose of loading and unloading said matrices, said matrix loader carrying bead aligning means including opposed vertically spaced upper and lower bead aligners aligned with the line of matrix supports for cooperation with each of said matrices from above and below.

8. The tire retreading apparatus of claim 7 wherein said matrix loader mounting means include an upper rail at the upper ends of said uprights and a lower rail on the bases remote from said uprights and said matrix loader overlying the line of matrix supports and having wheels engaging said rails.

9. The tire retreading apparatus of claim 8 wherein said upper bead aligner lies above the plane of said matrix support members and said lower bead aligner normally lies below the plane of said matrix support members, and each of said matrix support members has a central opening for the passage of at least a portion of said lower bead aligner into a tire engaging position.

10. The tire retreading apparatus of claim 7 wherein said upper bead aligner lies above the plane of said matrix support members and said lower bead aligner normally lies below the plane of said matrix support members, and each of said matrix support members has a central opening for the passage of at least a portion of said lower bead aligner into a tire engaging position.

References Cited in the file of this patent

UNITED STATES PATENTS

| | | |
|---|---|---|
| 1,674,387 | Campbell | June 19, 1928 |
| 1,841,408 | Glynn | Jan. 19, 1932 |
| 2,155,906 | Rihn et al. | Apr. 25, 1939 |
| 2,375,784 | Glynn | May 15, 1945 |
| 2,499,563 | Bill | Mar. 7, 1950 |
| 2,693,842 | Moore et al. | Nov. 9, 1954 |
| 2,734,225 | Glynn | Feb. 14, 1956 |
| 2,903,742 | Barefoot | Sept. 15, 1959 |
| 2,908,939 | Eriksen et al. | Oct. 20, 1959 |
| 2,916,772 | McDonald | Dec. 15, 1959 |
| 2,923,527 | Fannen | Feb. 2, 1960 |
| 2,921,336 | Crafton | June 19, 1960 |
| 2,942,295 | Duerksen et al. | June 28, 1960 |
| 2,981,977 | Fannen | May 2, 1961 |

FOREIGN PATENTS

| | | |
|---|---|---|
| 802,014 | Great Britain | Sept. 24, 1958 |